(12) United States Patent
Wu et al.

(10) Patent No.: US 10,440,025 B2
(45) Date of Patent: Oct. 8, 2019

(54) REMOTELY CONTROLLING ACCESS TO ONLINE CONTENT

(71) Applicant: Gryphon Online Safety, Inc, San Diego, CA (US)

(72) Inventors: John Jun Wu, San Diego, CA (US); John S Yi, San Diego, CA (US)

(*) Notice: Subject to any disclaimer, the term of this patent is extended or adjusted under 35 U.S.C. 154(b) by 0 days.

(21) Appl. No.: 15/616,668

(22) Filed: Jun. 7, 2017

(65) Prior Publication Data

US 2017/0353463 A1 Dec. 7, 2017

Related U.S. Application Data

(63) Continuation-in-part of application No. 15/443,058, filed on Feb. 27, 2017, now Pat. No. 10,212,167.

(60) Provisional application No. 62/346,566, filed on Jun. 7, 2016.

(51) Int. Cl.
| | |
|---|---|
| *H04L 29/06* | (2006.01) |
| *G06F 21/62* | (2013.01) |
| *G06N 20/00* | (2019.01) |
| *G06F 21/85* | (2013.01) |
| *H04W 12/08* | (2009.01) |
| *G06F 21/60* | (2013.01) |
| *G06F 21/74* | (2013.01) |

(52) U.S. Cl.
CPC .......... *H04L 63/10* (2013.01); *G06F 21/604* (2013.01); *G06F 21/6218* (2013.01); *G06F 21/74* (2013.01); *G06F 21/85* (2013.01); *G06N 20/00* (2019.01); *H04L 63/101* (2013.01); *H04L 63/104* (2013.01); *H04W 12/08* (2013.01); *G06F 2221/2149* (2013.01)

(58) Field of Classification Search
CPC .... H04L 63/10; G06F 21/6218; G06N 99/005
See application file for complete search history.

(56) References Cited

U.S. PATENT DOCUMENTS

| | | |
|---|---|---|
| 5,987,611 A | 11/1999 | Freund |
| 2005/0086521 A1 | 4/2005 | Chen |
| 2006/0064469 A1 | 3/2006 | Balasubrahmaniyan et al. |

(Continued)

OTHER PUBLICATIONS

Fink et al., "Application of Machine Learning and Crowdsourcing to Detection of Cybersecurity Threats" Feb. 2011, Preceedings of the DHS Science Conference Fifth Annual University Network Summit, Carnegie Mellon University, http://repository.cmu.edu/cgi/viewcontent.cgi?article-1049&context-lti.

*Primary Examiner* — John B King
(74) *Attorney, Agent, or Firm* — Sanjeev Kumar; Hunt Pennington Kumar & Dula PLLC

(57) ABSTRACT

Various embodiments provide an approach to controlled access to online content. Such control may be based on a multitude of factors including but not limited to website content, profile for the person consuming the data. In operation, machine-learning techniques are used to classify the websites based on community and social media inputs, crowd-sourced data, as well as access rules implemented by parents or system administrators. Feedback from users/admins of the system, including the instances of allowed or denied access to websites, in conjunction with other relevant parameters, is used for iterative machine-learning techniques. Embodiments may also allow for real, or near real-time, approval or denial of access to websites by registered admins.

15 Claims, 8 Drawing Sheets

(56) References Cited

U.S. PATENT DOCUMENTS

| | | |
|---|---|---|
| 2006/0140730 A1 | 6/2006 | Curtis |
| 2008/0182232 A1* | 7/2008 | Bannwolf ................ G09B 7/02 |
| | | 434/350 |
| 2010/0192202 A1* | 7/2010 | Ker ....................... H04L 63/101 |
| | | 726/4 |
| 2011/0237222 A1* | 9/2011 | Niejadlik ................ H04L 63/10 |
| | | 455/411 |
| 2012/0047560 A1* | 2/2012 | Underwood ........... G06Q 10/06 |
| | | 726/4 |
| 2012/0151046 A1* | 6/2012 | Weiss .................... G06F 21/604 |
| | | 709/224 |
| 2012/0151047 A1* | 6/2012 | Hodges ................. G06F 21/604 |
| | | 709/224 |
| 2012/0171990 A1* | 7/2012 | Williams ................ H04W 4/24 |
| | | 455/406 |
| 2013/0067081 A1* | 3/2013 | Liu ....................... H04W 12/06 |
| | | 709/225 |
| 2013/0191524 A1* | 7/2013 | Dupre ................. H04L 41/0213 |
| | | 709/223 |
| 2015/0026260 A1* | 1/2015 | Worthley ............... G06Q 10/10 |
| | | 709/204 |
| 2016/0253710 A1* | 9/2016 | Publicover ............. H04W 4/21 |
| | | 705/14.66 |
| 2016/0269412 A1* | 9/2016 | Farah ...................... H04L 63/10 |
| 2016/0344861 A1* | 11/2016 | Lee ................... H04M 1/72577 |
| 2017/0149795 A1* | 5/2017 | Day, II .................... H04W 4/02 |
| 2017/0187703 A1* | 6/2017 | Enrique Salpico ..... G06F 21/44 |

\* cited by examiner

REMOTELY CONTROLLING ACCESS TO ONLINE CONTENT

RELATED APPLICATIONS

This application is related to, and claims priority to, the following:
1. Provisional Application Ser. No. 62/346,566, filed Jun. 7, 2016; and
2. Non-Provisional application Ser. No. 15/443,058, filed Feb. 27, 2017.

The subject matter of the related applications, each in its entirety, is expressly incorporated herein.

BACKGROUND OF THE INVENTION

The present invention relates to methods, systems and apparatus for enabling controlled access to online content.

Parents with underage children have a need to control their children's web browsing activities to prevent access to harmful, unsafe or inappropriate websites. The current mechanisms to allow such control is through the use of white lists and black lists to allow or deny access respectively to requested websites to protect against inappropriate web content.

For the reasons stated above, and for other reasons stated below, which will become apparent to those skilled in the art upon reading and understanding the present specification, there is a need in the art for methods, systems and apparatus for enabling controlled access to online content.

BRIEF SUMMARY OF THE INVENTION

This Summary is provided to introduce a selection of concepts in a simplified form that are further described below in more detail in the Detailed Description. This Summary is not intended to identify key or essential features of the claimed subject matter.

Various embodiments provide methods, systems and, apparatus for controlled access to a websites by creating a data repository related to a plurality of websites from crowd-sourced data by producing a set of access rules for controlling access to the specific website. In embodiments, receiving a request by a user to access the specific website may include the user's profile that may further include user's age, day of the week, and time of the day. Some embodiments may include receiving information related to the specific website from the data repository related to the plurality of websites. Various embodiments may combine the received user profile with the received specific website data to create and assign a safety rank to the specific website, which may be used, in conjunction with the set of access rules, to create a specific access rule for the user to control user's access to the specific website. A router may be controlled to allow or deny access to the specific website by applying the created specific access rule that controls the access to the specific website for that particular user. An embodiment may implement machine-learning techniques to update the data repository related to the plurality of website, or the set of access rules for controlling access to the specific websites, or a combination thereof, during operation.

Various embodiments provide systems and apparatus for controlled access to websites, where a self-learning control module, in conjunction with a computer readable storage containing a data repository related to a plurality of websites, may be sued to control a router to allow or deny access to websites. According to some embodiments, a control module may be configured to use certain access rules in conjunction with safety rank assigned to a website, and input from admins to control a router to allow or deny access. In some embodiments, the said control module may use machine leaning techniques by using the results associated with previous requests to access the website by other users to update the data repository related to the plurality of websites.

Embodiments of systems and methods disclosed herein additionally allow for remote control of access to online content. Such embodiments may provide for a client to request and an admin to approve or deny said request to access online content in real or near-real time. Furthermore, such embodiments may allow for the admin to perform such control from a remote location via a remote, potentially mobile, electronic device (such as a smartphone).

Many of the embodiments discussed herein may be performed at either the server or router level.

BRIEF DESCRIPTION OF DRAWINGS

The several embodiments may be more fully understood by a description of certain embodiments in conjunction with the attached drawings in which.

DETAILED DESCRIPTION

Figure 1:
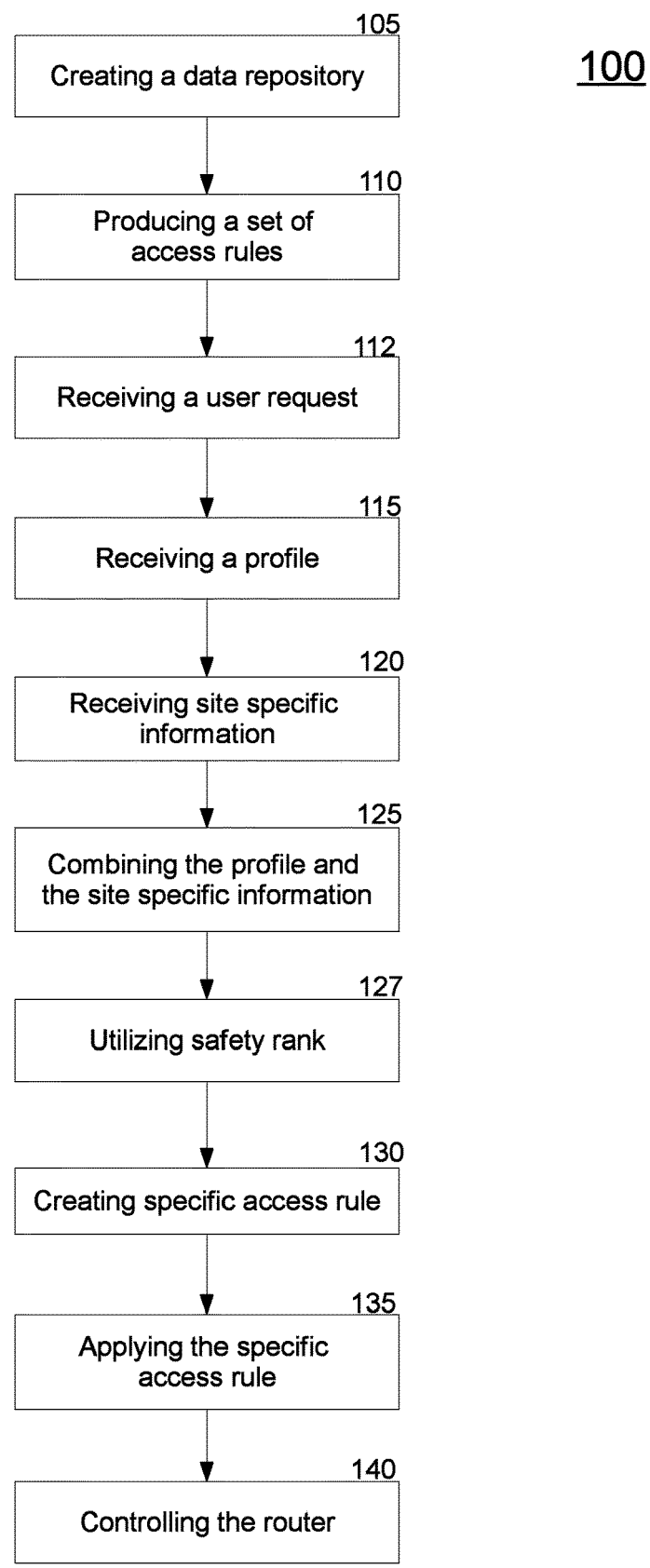
FIG. 1 illustrates, in flowchart form, the series of steps involved in controlling a request to access a specific website according to some embodiments.

As disclosed herein, current methods of creating white and black list are manual, cumbersome, time consuming, and require a certain amount of knowledge about target websites that is difficult for one individual to obtain in an efficient manner. Parents are concerned about their children accidentally encountering online content that is inappropriate for their age as well as the amount of time spent online by their children. Accordingly, parents have a need to be able to control the websites that the children can visit and the amount of time spent online by their children. Parents may also want to restrict access to certain websites on certain days, or specific times of day, to avoid distractions for their children. The fact that a specific time of day and/or particular website content may be appropriate for certain age group of minors but not a younger age groups makes the parental control even more difficult. Additionally, websites get updated with new content frequently and the appropriateness of any particular website may vary depending upon the content, which demands constant monitoring and content filtering.

As disclosed herein, it will be understood that current systems and methods of control are either inadequate or require complexity beyond the capabilities of most parents. The process of providing a safe and controlled browsing experience for children is cumbersome, time consuming, and requires a high level of knowledge of different websites, as well as expertise in current technologies. These problems may be addressed, lessened or resolved by systems, apparatus and methods as herein disclosed, which may rank and score websites through machine learning, taking continuous input from community and social networks, and utilizing content filtering and other techniques to provide a mechanism and relevant guidance to parents to enable them to control the access to any requested website based on the age of their children, as well as to control specific days during the week and times of day when the children can access any particular website. It will be understood that such controls may be automated.

In embodiments, a method for controlling browsing to access the Internet may include limiting access by processing of access rules of an access rules source to determine access criteria, access permissions, or both for an Internet domain or URL. In embodiments, such processing of access rules may further include adapting such processing in relation to an adaptive processing learning protocol. In embodiments, such processing of access rules may further include adapting such processing, adapting such access rules, or both, in relation to an adaptive access rules learning protocol. In embodiments, such processing of access rules may further include adapting such determining of access criteria, determining of access permissions, or both, in relation to an adaptive determination learning protocol. It will be understood that such processing may include plural of the aforementioned modes of adapting such processing. In embodiments, such a method for controlling browsing may include processing of access rules of an access rules source to determine access criteria or permissions for an Internet domain or URL by reference to a machine learning technique. In embodiments, such a method for controlling browsing may include processing of access rules of an access rules source to determine access criteria or permissions for an Internet domain or URL by reference to crowd-sourced data. In embodiments, such a method for controlling browsing may include processing of access rules of an access rules source to determine access criteria or permissions for an Internet domain or URL, may enable age appropriate browsing, content appropriate browsing, or both. It will be understood that embodiments may include systems (aspects being illustrated, for example, in FIG. 6), apparatus, or both which include a processor performing the aforementioned methods or functioning in accordance with such aforementioned methods, or as otherwise disclosed herein.

The novel systems, apparatus and methods disclosed herein may be suitable for use in homes and communities such as schools, where there is a need to restrict access to unsafe or inappropriate websites by under age users. The systems, apparatus and methods may be suitable for use in environments where there is a need to limit time spent online by users or to allow Internet access to certain specific time periods. Embodiments may include self-learning methods and systems that rank and score websites in order to guide parents in their decisions whether any particular website should be allowed or blocked for children of certain age groups and, or, during specific periods of any given day.

Various embodiments may provide an approach to classifying websites that contain suitable content, taking into consideration the profile of the person consuming the data. In operation, machine-learning techniques may be utilized to create a safety rank for websites based on community and social media inputs and crowd-sourced data, as well as admin specific determinations, to classify websites as safe for browsing based on the age of the user. During operation the system may identify relevant features that dictate the appropriateness of a website, such as age of user, day of the week and the time of day when the request for access to the website is made and provides for automatic decision making, as well as manual override by admin, to either allow or deny access to the particular website by controlling the router through which the user is attempting to access said website. Feedback from users/admins of the system, including the instances of allowed or denied access to websites, in conjunction with other relevant parameters, may be utilized by the machine-learning techniques.

The classification of websites may use information from community and social networks as well as results from a web crawler searching for various keywords on websites. The above informational inputs may be assigned different weights or weighting based on their importance. The weighted information may be aggregated together in order to generate a safety rank for the requested website. The safety rank assigned to the particular website, in conjunction with content filtering mechanisms to block inappropriate content, may be used to control the router to allow or deny access to the requested website. The machine learning techniques may be iterative in nature, and continue to learn over time, and may utilize the changing data from social and community networks, human input as well as previous results of classification for the web site.

Referring to FIG. 1, in an illustrative embodiment, a method may provide approaches to classifying websites for safety and appropriateness for the user based on a number of parameters. The appropriateness of the websites for the user may be determined with consideration given to the user's personal profile, which may include, as an example but not limited to, the user's age; the time of the day the request to access the website is made, the day of the week; a personal profile setup for the user by an admin utilizing profile parameters; or combinations of the preceding. A personal profile may include for a user, for example, study time, dinner time, family time, and acceptable internet browsing time. The classification of web sites may further include using crowd-sourced data, information from community and social networks, and usage and control patterns of other similarly situated users in an enrolled community; results from a web crawler that searches for various keywords on websites; or a combination of same. The various informational inputs may be assigned different weights based on their importance to the user and admin to create a safety rank for the requested website. The machine learning techniques have access to the continuing data stream resulting from the processing of community and user/admin data to update the data repository and fine-tune the access rules. The safety rank, in conjunction with a content filtering mechanism may be used to control the router to allow or deny access to the requested website. The machine learning techniques are iterative in nature and continue to learn over time, utilizing the changing data from social and community networks, human input as well as previous results of the classification for the website, including the instances of granting or denying access to the particular website. During operation, the system evaluates the data repository and applies the access rules in real time to control a router to allow or deny access as well as provide information to admins to allow for informed decision-making when overriding or enforcing the application of the default access rules.

The methods and systems described herein, generally discuss some of the embodiments focused on access and controls necessary for controlling online access for minors. This is by way of an example only and not meant to be a limitation of the invention as the invention can be practiced in other similarly situated environments where there is a need to control online access by users, such as in teaching and training facilities, government and private office environments which may involve predominantly adult users. Accordingly, the term admin used in this discussion may pertain to parents, teachers, managers or professional information technology personnel who set the guidelines for user access in environments administered by them.

In the discussion that follows, a section entitled "Example Access Control" describes a set of steps that may be used to determine whether access to a specific website requested by a user should be allowed or blocked. Next, a section entitled "Example Profile Based Access" describes an example of the user profile based decision-making that can be utilized in connection with various embodiments. Thereafter, a section entitled "Example Machine Learning" describes mechanisms that can be deployed for machine learning in accordance with one or more embodiments. A section entitled "Example Operation" describes operational aspects of the access control mechanisms and the iterative machine learning process in accordance with one or more embodiments. Finally, a section entitled "Example System Implementation" describes an exemplary system implementation in accordance with one or more embodiments.

Consider now an exemplary process flow, in which various embodiments can be practiced.

Example Access Control

Figure 6:
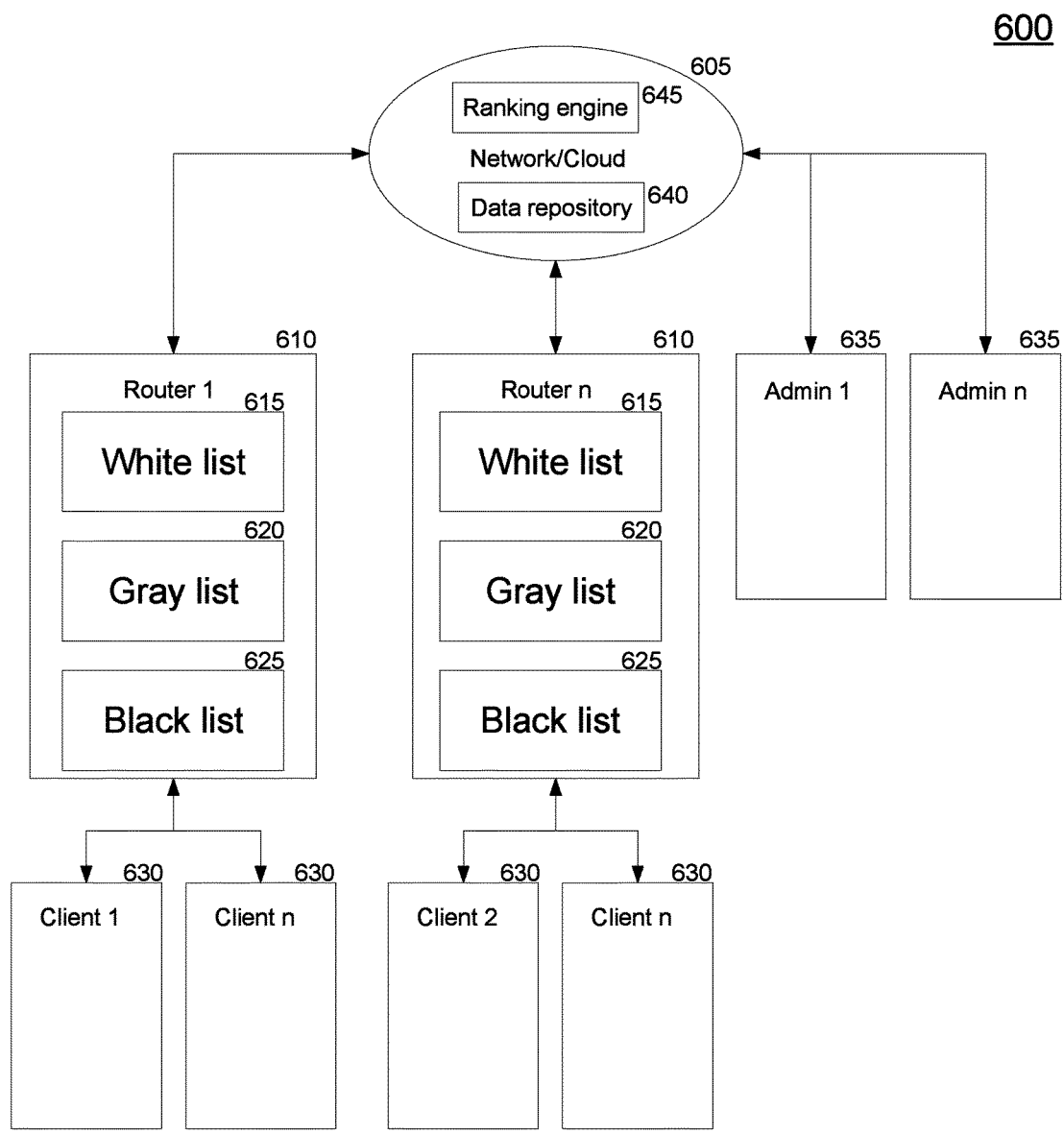
FIG. 6 illustrates, in block diagram form, an exemplary system that can be used to implement the invention according to some embodiments.

FIG. 1 illustrates, in flowchart form, an example method 100 of a set of steps that can be used to implement the techniques described herein according to some embodiments. FIG. 6 illustrates, in a block diagram form, an exemplary system 600 that can be used to practice the invention according to some embodiments. The illustrated example implementation 100 includes: the step of receiving user request to access a specific website 102; the step of creating a data repository 105; the step of producing access rules 110; the step of receiving user's profile 115; the step of obtaining website specific information for a requested website 120; the step of combining the user profile information with the web site specific information to create a safety rank 125; the step of utilizing the safety rank 127; the step of creating specific access rule to be used for access control decision 130; the step of applying specific access rule to determine whether to allow or deny access to the website 135; and the step of controlling the router 610 in FIG. 6 to allow or deny access to the requested website 140.

The step of creating a data repository 105 may, as an example but not as a limitation, use whitelists/blacklists to identify safe/unsafe websites respectively. The step of creating a data repository 105 may further employ use of greylists 620 to identify websites that may require further analysis to determine whether they are safe to allow access or not. As an example, but not as a limitation, the use of whitelists/blacklists/greylists and the categorization of websites as safe, unsafe or needing more analysis may be accomplished by comparing the safety rank of a particular website to a set of predetermined threshold safety rank values, a safe threshold safety rank and an unsafe threshold safety rank, where the safe threshold safety rank is equal or higher than the unsafe threshold safety rank. If the particular website safety rank is above the safe threshold safety rank value, it may be categorized as a safe website and maybe included in a whitelist. If the particular website safety rank is below the unsafe threshold safety rank value, it may be categorized as an unsafe website and maybe included in a blacklist. If the safety rank of the particular website falls in between the safe threshold safety rank and the unsafe threshold safety rank, it may be categorized as a website requiring further analysis prior to designating it as safe or unsafe and maybe included in a greylist. According to some embodiments, the safe and unsafe threshold safety rank values may be different depending upon user profile. In yet another embodiment, the safe and unsafe threshold safety rank values may be adjusted through machine-learning techniques discussed below. The data repository 640 being used in the step of creating a data repository 105 may, as an example but not as a limitation, may be stored in the local storage memory of the router, on a storage device on the local area network (LAN); on a wireless network; on an intranet; on the user's device 630 being used to access the website; or may be available by accessing a cloud storage device 605.

The step of producing a set of access rules 110 may, as an example but not as a limitation, implement a simple rule such as lookup of the website in whitelist or blacklist that is updated regularly, or may include a more complex set of rules that take into consideration other factors such as, preexisting data associated with similarly situated users in some data repository, traffic patterns for the requested website, safety data associated with the requested website obtained as crowd-sourced data from social or community networks, presence or absence of access rights from an admin, interactive authorization from an admin, safety indexes for the websites created by means of a web crawler performing keyword searches to assign a safety index to the websites, etc.

The step of receiving a user profile 115 may, as an example but not as a limitation, receive data associated with the user stored in a database, or receive such data as a parameter during the request by user to access the requested web site, which may, as an example but not as a limitation, include the user's age, access permissions associated with the user for access to all or certain requested websites depending upon, either independently or in combination, the day of the week and the time of day. The step may further include data associated with similarly situated users in social media groups or community groups.

The step of receiving website specific information 120 may, as an example but not as a limitation, include information about the requested website from website rating systems, crowd-sourced data from social or community based rating system, feedback associated with the requested website from other users, parental access control rules associated with the requested website, etc.

The step of combining the profile and the website-specific information 125 creates a safety rank for the requested website. The safety rank may be different for users with different profile parameters such as, the age of the user, the time of day, designation of the time as study or family time by a parent or other parental rules setup for the user.

The step of creating specific access rule 130 may, according to some embodiments, modify the access rules produced by the step of producing a set of access rules 110 by combining the safety rank generated by step 125 with the user profile from step 115 to create a specific access rule. As an example of modification of access rules, according to some embodiments, the step 110 may be implemented by splitting a default access rule produced by step 110 into multiple access rules that may take into consideration one or more factors from the user profile obtained in step 115 such as the age of the user, the time of the day the request is made, the day of the week, and may accordingly create multiple ranks for the requested websites dependent upon the factors from the user profile obtained in step 115.

Figure 2:
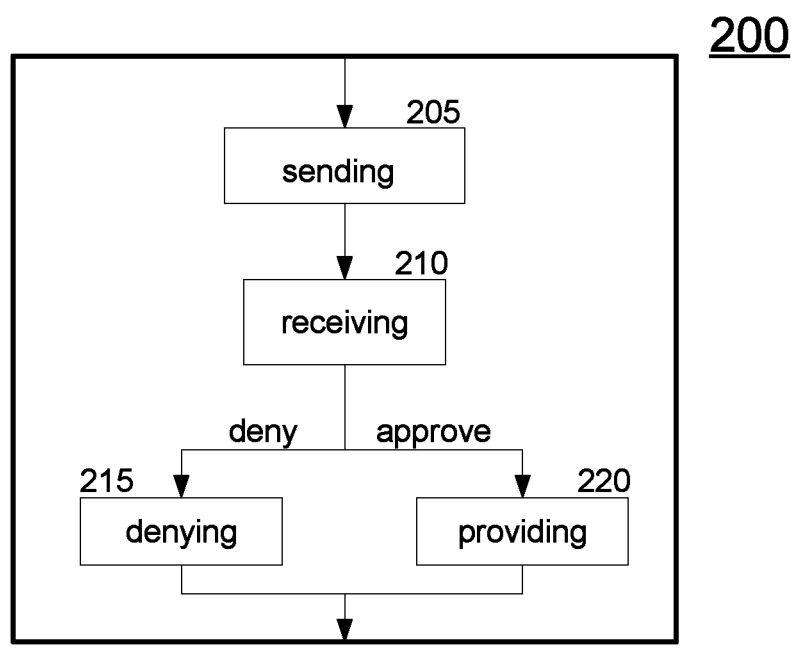
FIG. 2 illustrates, in flowchart form, the series of steps involved in interactively controlling access to a requested website according to some embodiments.

The step of applying the specific access rule 135 determines whether the access to the website should be granted or denied. The step may, according to some embodiments, communicate with an admin if the user profile in combination with the safety rank for the specific website requires admin approval prior to allowing access and wait for such an approval before granting access. FIG. 2 illustrates, in flowchart form, an example implementation 200, according to some embodiments, which utilizes such an approval mechanism from an admin. The step includes internal steps of: sending a request to the admin 205; polling for an answer from the admin until it is received 210; step of denying access to the particular website 215; and step of providing access to the website 220. The request for approval to access the particular website is sent to the admin and the user is notified that the request to access the particular website is waiting for an approval from the admin. Depending upon the response from the admin, the access to the website is either denied, or granted.

The step of programming the router 502 may, according to some embodiments, result in resolving the DNS for the requested website and sending the IP address to the browser to allow access if the result of step 135 was to grant access, or to update the data repository for the page as not allowed if the result of step 135 was to deny access. The step may, according to some embodiments, update the whitelist or blacklist with the website information accordingly. According to yet other embodiments, the step may assign certain weighting to a certain variable that may be used to modify the safety ranking of the particular website. According to yet other embodiments, the results of the step may be used to modify the safety ranking of other similar websites in the data repository 640.

Example Profile Based Access

In general, the appropriateness, suitability, and safety of a website is not absolute, considering the varied characteristics associated with the users accessing the websites. The same website that may be suitable for a teenager may not be suitable for younger children. Parents also have a need to control the amount of time spent online by their children. Parents may also want to limit the amount of time a child spends on a specific website. Similarly, family time or study times may dictate certain restrictions to be imposed on online activities of children at home, dictating what particular websites the users may or may not have access at what particular times. The parents may desire their children to have greater access for online activities during weekends and on holidays as compared to on school days.

It is anticipated that communities allowing children to have access to online activities, such as schools and libraries, may desire certain restrictions imposed on online access for children utilizing their networks to go online. It might be desirable to block access completely to encourage activities where online access can be a distraction, such as classroom time, or family dinners. Just as a website that is appropriate for older kids might not be appropriate for younger kids, the restrictions imposed on younger kids as to the websites that are accessible or the amount of time they can spend on online activities might not be a good match for older kids.

If not impossible, it is a very difficult task for a parent or admin to create and manage such access control scheme for multiple children with varied profiles as to age, maturity and family environment. Furthermore, it requires substantial expertise and an inordinate amount of time on the part of the parents or admins to make informed decisions and implement appropriate access control mechanisms. These complexities can be addressed by means of the present invention by implementing a community based online access mechanisms which leverage crowd-sourced data and machine learning techniques to provide custom access rules based on the profile of the user and the unique desires of their parents.

Figure 3:
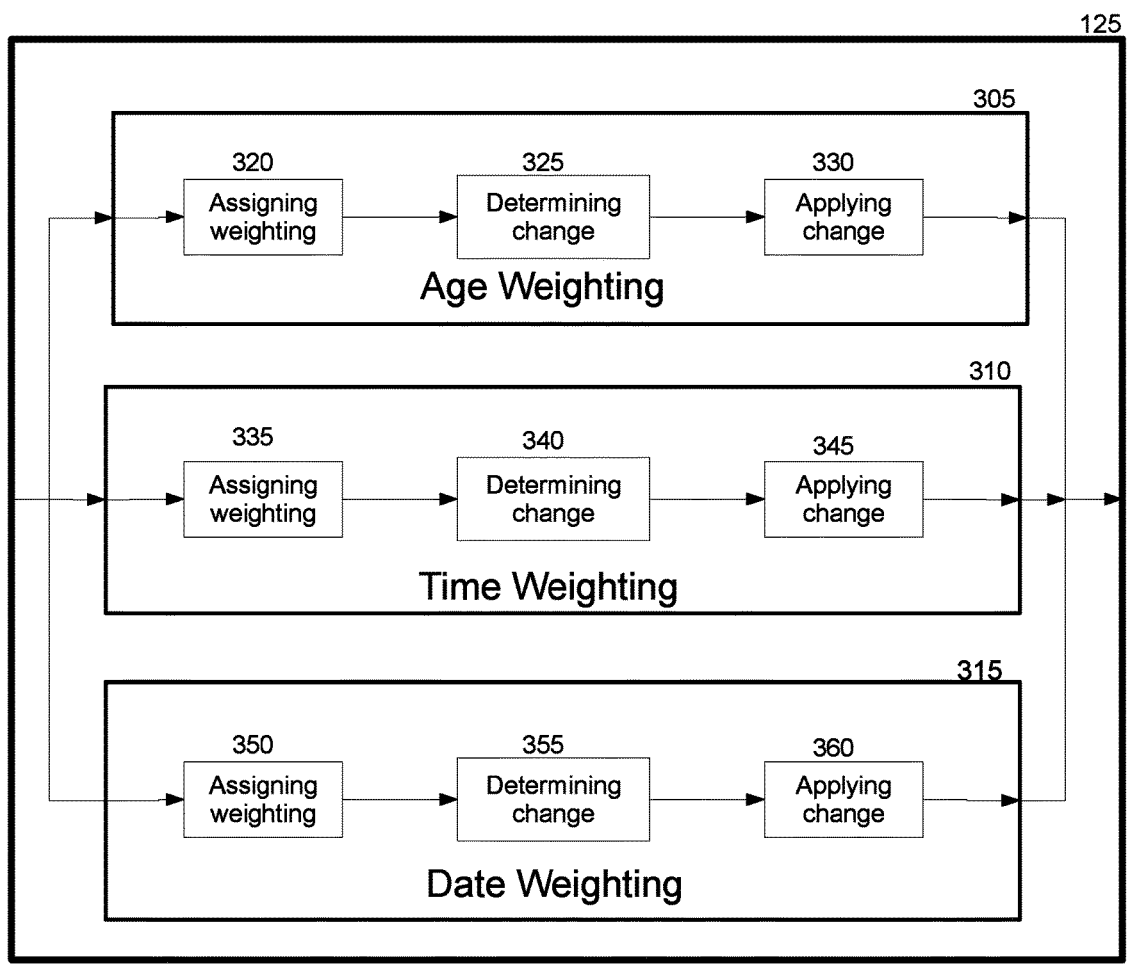
FIG. 3 illustrates, in flowchart form, the application of user profile characteristics in the access control decision process according to some embodiments.

FIG. 3 illustrates, in flowchart form, an example implementation 125, according to some embodiments, that utilizes a user profile that includes the age of the user, the time of the day and the day of the week when the user requests the online access. For example, according to some embodiments, the user profile data may also include specific rules imposed by the parents or admins, such as no access during dinner hour, no more than one hour of game playing at certain online website, restricted access to certain preapproved websites during study hours, etc.

The example profile based access 125 includes: a module for applying an age weighting value to the safety ranks for the plurality of websites 305; a module for applying a time weighting value to the safety ranks for the plurality of web sites 310; a module for applying a date weighting value to the safety ranks for the plurality of websites 315. According to some embodiments, the safety rank for plurality of websites may be created and stored as a formatted data structure, such as a matrix of values where each row may contain values associated with a different age group of users, each value being a decimal numerical value between 0.0 and 1.0 or a percentage safety-rank value between 0 and 100. As would be evident to one of normal skills in the art, the formatted data structures may use any of the available database techniques for its implementation. Again, as would be evident to one of normal skills in the art, the storage used for the data repository may be implemented by use of a storage device, such as computer memory, hard disks, flash memory devices, or a cloud server that may be accessible by means of cloud services. This safety rank may be utilized as an initial safety rank for the particular website and modified based upon the user's age to increase or decrease the safety rank.

Consider the example according to some embodiments, where the module 305 for applying the age weighting further includes: a sub-module for applying an age weighting associated with various age groups that user may fall under to the safety ranks of a plurality of websites 320; a module for determining the appropriate age bracket and the corresponding age weighting value for the user 325; a module for applying the age weighting value corresponding to the age of the user to the safety rank for the specific website 330. Sub-module 320 in FIG. 3 retrieves the safety ranks for a plurality of websites from the data repository and applies a weighting based on predefined weights for a plurality of websites. Subsequently, sub-module 325 determines the age bracket the user falls in, based upon the user profile and combines that with the retrieved data in sub-module 320 to choose the appropriate safety rank associated with the age bracket. As a next step, sub-module 330 may use the arrived at safety rank to modify the access rule for the specific website.

The module for applying the time weighting value 310 further includes: a sub-module for applying a time weighting value associated with various times of day 335; a sub-module for determining which time period block contains the time of day when the request to access the website is made 340; a sub-module for applying the time weighting value corresponding to the time period that the request to access the website is made to the safety rank of the specific website 345. According to some embodiments, the user profile may include preset times of day when the user may access certain websites. Sub-module 335 in FIG. 3 may apply the predefined access rules for certain time of day to the data repository related to a plurality of websites on a storage device in the cloud to create a formatted data structure specific for that time of day.

Sub-module 340 may, according to some embodiments, utilize parental preferences and access control rules which could be part of the user profile to determine whether the online access at that particular time is allowed or not. Sub-module 345 in FIG. 3 may utilize the results from sub-module 340 to modify the access rule for the specific website. There may be a need to restrict access to a particular website for a limited time only, such as allow access to some gaming website for 1 hour. As would be evident to one of normal skills in the art, the time related rule might be implemented by means of a token where sub-module 340 in FIG. 3 would determine the validity of the token and depending upon whether the token is still valid or has become invalid pass on appropriate input to sub-module 345 for modification to the access rule. In some other embodiments, the processing in module 310 can be further utilized to inform the user of amount of time left before online access would be blocked to that website.

The module for applying the date weighting value 315 further includes: a sub-module for applying a day of week weighting value associated with the days of the week 350; a sub-module for determining the appropriate day of the week when the request to access the website is made 355; a sub-module for applying the date weighting value corresponding to the day of the week to the safety rank associated with the requested specific website 360. The access permissions for a particular website for a user may be different depending upon the day of the week. The access to a particular web site may only be allowed on weekends or holidays but not on school days according to some embodiments. According to some other embodiments, the access to a particular website may be allowed for a shorter amount of time on weekdays than on weekends and holidays. According to some additional embodiments, the access to a particular website may be restricted to different durations for different days of the week.

Sub-module 350 in FIG. 3 may apply the predefined access rules for certain days of the week to the data repository related to a plurality of websites on a storage device in the cloud to create a formatted data structure specific for that day of the week. Sub-module 355 may, according to some embodiments, utilize parental preferences and access control rules which could be part of the user profile to determine whether the online access is allowed or not for that day of the week and if allowed, whether there is a limit of time that the user can access that particular website. For example and not as a limitation, some parents may choose to block online access to a social media site for their children during study hours of 4 pm and 7 pm on weekdays, which may be included in the user's profile and available to use by Sub-module 355. Sub-module 360 may use the results from sub-module 355 to modify the access rule for the specific website deepening upon the day of the week or the amount of time access has been granted for that day of the week.

Example Machine Learning

The methods and systems for allowing age and content appropriate access to websites can be improved over time by employing machine-learning techniques. The data repository containing safety rankings for the plurality of websites may constantly be updated over time through the use of factors such as crowd-sourced data, feedback from users and admins, continuous monitoring of websites by means of a web crawler that searches and counts instances of specific keywords on websites, as well as previous instances of granting or blocking access to those websites. For example and not as a limitation, each of the above inputs may be assigned a weighting that is used to aggregate the positive or negative change to be made to the safety rank of the particular website. Considering as an example some embodiment for the application of crowd-sourced data to update the data repository, every 10 denials of access to a particular website by the enrolled community may result in 1% reduction in the safety rank of the particular website stored in the data repository, but every 10 request to access the particular website that were granted may only increase the safety rank of the particular website stored in the data repository by 0.5%.

Figure 4:
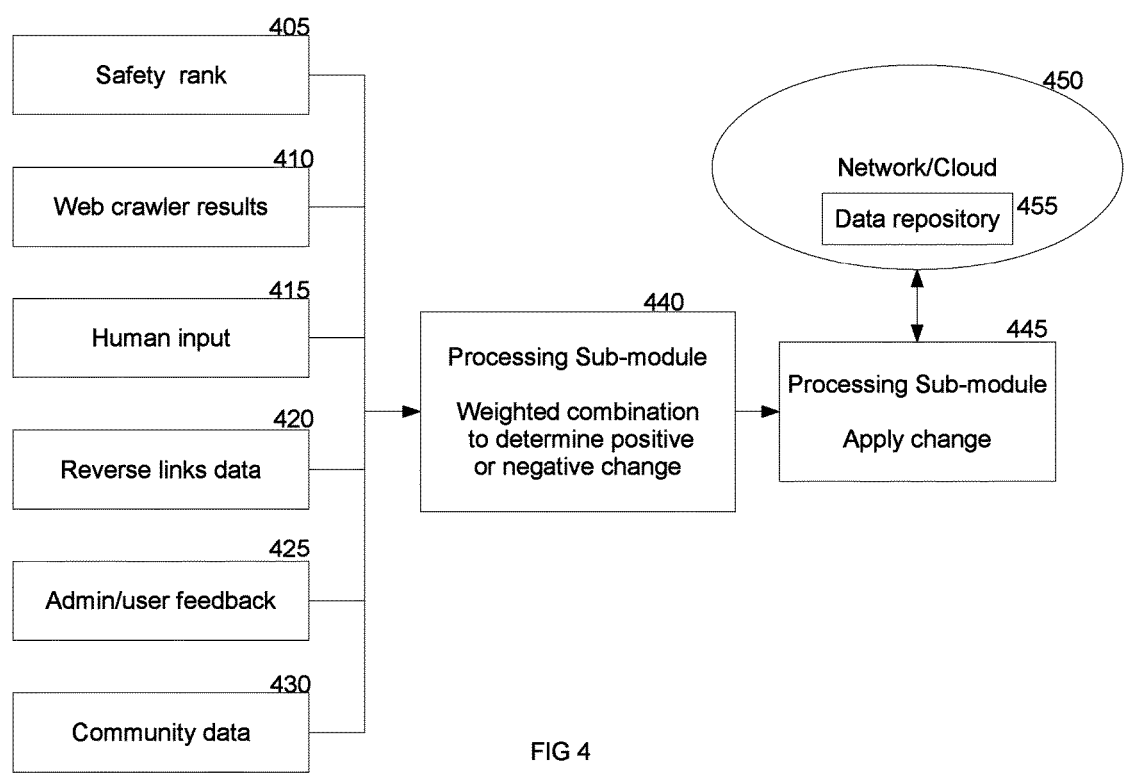
FIG. 4 illustrates, in flowchart form, the process of updating the data repository by utilizing machine learning techniques according to some embodiments.

FIG. 4 illustrates, in a block diagram form, an example implementation of the machine-learning technique 400 according to some embodiments. The illustrated exemplary implementation of machine learning techniques 400 further includes: input calculated safety rank of the particular website 405; input safety rank of the particular website as determined by a web crawler counting instances of certain keywords on the particular website 410; input instances of access granted or denied by admins for the particular website 415; input value based on safety rank of other websites linking back to the particular website 420; input based on safety rank provided by other users for the particular website 425; input based on community feedback for the particular website 430; a processing sub-module that combines all the inputs with different weighting given to each input to calculate a positive or negative rating for the particular web site 440; a data repository 455 stored in the cloud 450; and a processing sub-module 445 that gets the current safety rank for the particular website from the cloud data repository, modifies the rank according to the positive or negative rating calculated and updates the data repository with the updated safety rank for the particular website.

In the illustrated exemplary implementation 400, the system has multiple inputs to determine whether the particular website's safety rank needs to be updated, and if it does, whether the required update increases or decreases the safety rank of the said website. In the illustrated embodiment, the safety rank generated in step 125 in FIG. 1 is used as one of the inputs 405 to determine the effect on the safety rank of the website. The safety rank arrived at for the particular website by means of a web crawler doing keyword searches on a plurality of websites may be used as an additional input 410 to determine the change to the safety rank of the said website. Furthermore, as illustrated in the embodiment 400, human input that may assign a safety rank to a particular website, may be used as another input 415 for calculating the change in the safety rank for the particular website. In general, websites link back to other websites that are similarly situated. Accordingly, another input 420 that may be used to modify the safety rank of the particular website maybe the collective safety ranks of other websites that link back to the particular website. Additionally, according to some embodiments, the feedback from users and admins as to the safety rank of the particular website and the instances of granting or blocking access to the particular website by admins maybe used as another input 425 in the calculation of the new safety rank for the particular website. According to yet other embodiment, another input 430 that may be used is the crowd-sourced data about the particular website through community feedback. The sub-module 440 illustrates, according to some embodiments, how these inputs may be assigned varying weighting values and combined to determine desired change to the safety rank of the particular website, whether it be positive or negative. In the exemplary illustration 400, the current safety rank of the particular website is obtained from the data repository 455 in the cloud 450 and after applying the required positive or negative adjustment to the safety rank as illustrated in sub-module 445, the new safety rank is stored back in the data repository 455 stored in the cloud 450.

Example Operation

Figure 5:
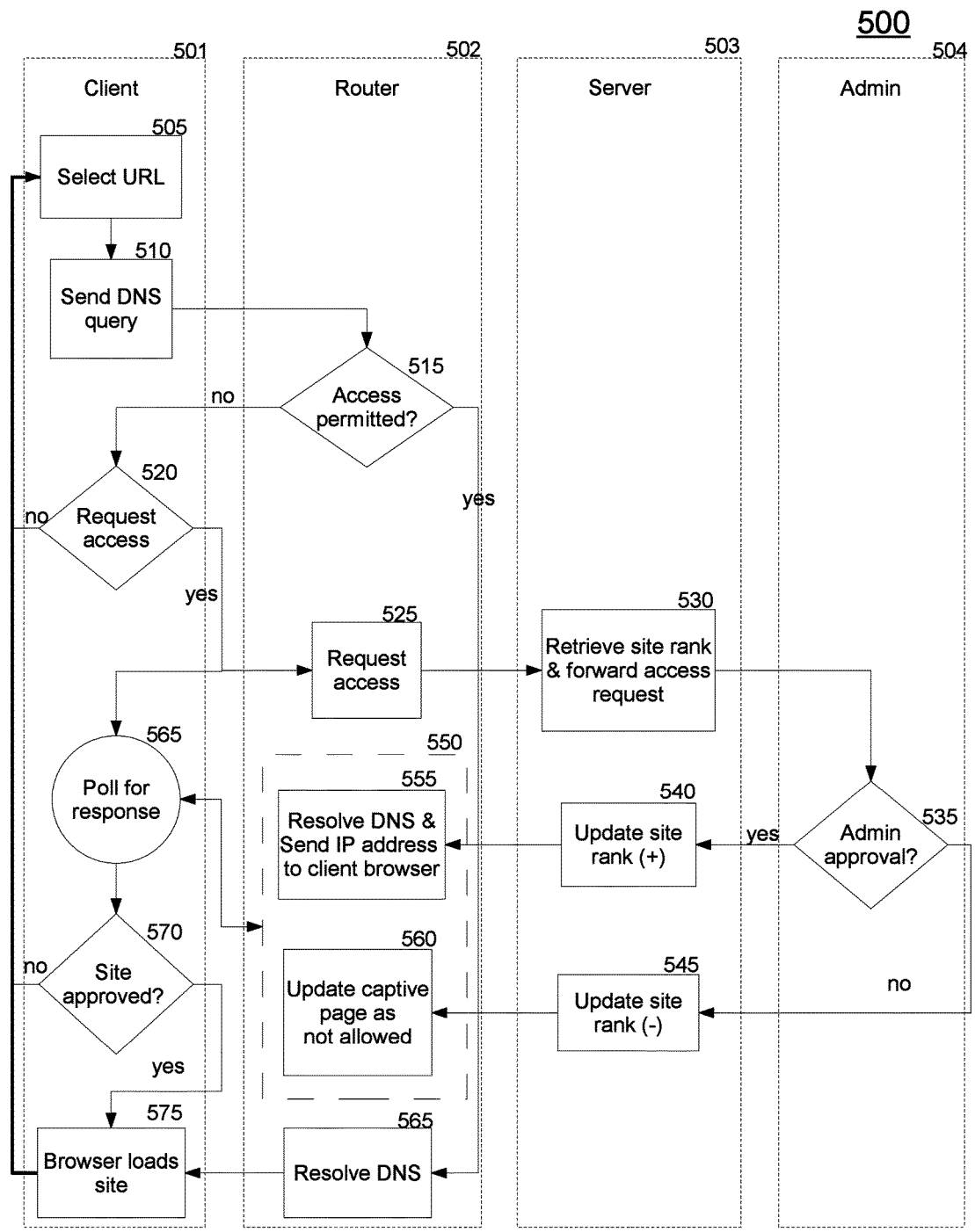
FIG. 5 illustrates, in flowchart form, the decision process and an exemplary system architecture according to some embodiments.

FIG. 5 illustrates, in flowchart form, an exemplary system 500 and the interaction between various components of the exemplary system, according to some embodiments, where the exemplary system includes: a client module 501 which represents the device used by the user to access a particular website and may be any general or specific device that allows access to the Internet; a router module 502 which may be used to allow or deny the access to the said website; a server module 503 which, for example and not a limitation, may be implemented as a local server, a community server available throughout the community network, a cloud server, or a group of individual machines providing the server functionality; and an admin module 504 which, for example and not a limitation, may be implemented by means of a desktop computer, notebook computer, tablet, mobile phone, a communication device, an app running on a mobile device, or a special purpose device to perform the admin functions.

An embodiment about to be discussed describes the data flows and message exchanges between the various modules illustrated in FIG. 5 according to some embodiments. The user may request access to a particular website by choosing a URL for a particular website as shown by the sub-module 505. As a result of the query, the client module may send a query 510 to the router module to check whether the access to the particular website is permitted 515. According to some embodiments, the determination of access rights to the particular website maybe accomplished in the router module by means of verifying the presence of the particular website in some whitelist stored in the router. According to some other embodiments, the task may be accomplished by the router module communicating with the server module to retrieve access rights for the particular website from some data repository stored on the server. According to yet other embodiments, the permission data may be retrieved from some predefined cloud storage. If the retrieved access rights permit access to the particular website, the sub-module 565 may resolve the DNS and send the resolved IP address to the client sub-module 575 which would result in the client getting access to the particular website. Alternatively, if the retrieved access rights do not allow access, the router may, according to some embodiments, instruct the client module to inform the user that the access to the particular website is not allowed. According to some other embodiments, the router module may instruct the client module to request permission from an admin through the sub-module 520. As a result, the user may either request permission to access the particular web site by sending an access request for the admin through the sub-module 525 in the router, or the user may choose to request access to another website that may be permitted through the sub-module 505. If the user chooses to request admin's permission, the permission request is passed from the sub-module 525 in the router to the sub-module 530 in the server module 503 as well a message to the client module where the sub-module 565 may wait, polling for a response from the admin 504. According to some embodiments, the server sub-module 530 may retrieve the safety rank for the particular website from a data repository stored locally on the server. According to some other embodiments, the retrieval of the safety rank for the particular website may be accomplished by means of access to a remote data repository which is stored on a storage media accessible through some network. According to some embodiments, if the safety rank for the particular website is above a safety threshold value, the admin may allow access the particular web site, and if the safety rank for the particular website is below the safety threshold value, the admin may deny the access to the particular web site by sending the appropriate response back to the router module. According to some embodiments, the approval or denial of access to the website may result in the router either resolving the DNS in sub-module 555 and passing the IP address to the client module so that the particular website can be loaded, or to instruct the router to block access to the particular website 560, and instruct the client module to inform the user that the access to the particular website is not allowed. According to some other embodiments, the approval or denial by admin may also be used to adjust the safety ranking of the particular website either in a positive direction 540, or in a negative direction 545 respectively. According to yet other embodiments, the approval or denial by the admin may be used to add the particular website to the whitelist or blacklist respectively. According to some embodiments, the client module waits for the response from the admin in sub-module 565 and based on approval or denial 570, either loads the particular website or informs the user that access to the particular website is blocked. According to some other embodiments, the waiting for response from the admin in sub-module 665 may automatically timeout after a certain amount of time if no response received and inform the user that the access to the particular website is not allowed.

Example System Implementation

FIG. 6 illustrates, in block diagram form, an example of a system 600 that can be used to practice the invention according to some embodiments. The exemplary system 600 includes: one or more router devices in the router module 610; a set of client modules 630 that represent a set of users requesting to access various websites through one of the router modules 610; a set of another client modules 630 that represent a set of users requesting to access various websites through another one of the routers modules 610; a cloud service module 605 that further includes a ranking engine sub-module 645 and a data repository sub-module 640; and a set of admin modules 630.

According to some embodiments, a particular admin module maybe implemented by means of a mobile app running on a mobile device. According to some other embodiments, a particular admin module may be implemented by means of a desktop or portable computer. According to yet other embodiments, any particular admin module may be implemented by means of a specific electronic communication device. According to some embodiments, a particular client module may be a general-purpose computer, such as a desktop or a portable computer. According to some other embodiments, a particular client module may be a portable electronic device, such as a tablet or a mobile phone.

The router module 610 further includes: a sub-module 615 that stores safety rank information regarding a plurality of safe websites, considered safe according to certain criteria, a sub module 620 that stores information about known unsafe websites according to some other criteria and a sub-module 625 that may be used to store information regarding a plurality of websites that neither are known safe websites, nor are known unsafe websites. According to some embodiments, the safe and unsafe website information may be stored in the form of whitelists and blacklists. According to some other embodiments, the safe and unsafe website information may be stored as a safety rank associated with the plurality of websites.

According to some embodiments, a user may request to access a specific website by sending the said request to the router module 610. The user request may include user profile information such as user's age and particular restrictions put in place by some admin as to user's ability to access certain websites, either altogether or during certain periods of time.

According to some embodiments, the router module may determine whether to grant or deny access depending upon the determination of the specific website being a member of the whitelist or blacklist respectively. If the request to access the specific website is granted, the router ay resolve the DNS and pass on the IP address for the specific website to client module 630, which allows the user to access the specific website.

In case the specific website is neither a member of the white nor that of the blacklist, according to some embodiments, the router may send a site access request to an admin through a cloud service messaging mechanism. In some embodiments, the request from router may be supplemented with site-specific information in the cloud, such as a safety rank for the specific website before sending the request to an admin, said safety rank may be produced by the ranking engine 645, and may be stored in the data repository 640 stored in the cloud storage 605. The admin may utilize the site-specific data, the safety rank of the specific website, and user profile information to either allow or deny the request to access the specific website by the particular user. The response from the admin is communicated through the cloud interface back to the router. In case the admin response was to grant the requested access to the specific website, the router 610 may resolve the DNS and pass the IP address to the client module 630 allowing the user to access the specific website. In case the admin response was to deny user the requested access to the specific website, the router 610 may send the IP address of a captive page to the client module 610, which informs the user that the access to the website is denied.

According to some embodiments, the above interactions between the set of users and the particular router device that the users are connected to may be repeated for other set of users connected through a different router device. Similarly, repeated interactions may occur between the router devices and the respective admins through the cloud interface. According to some other embodiments, the individual actions of various admins in the community, granting or denying access to a plurality of websites, may be aggregated by the ranking engine sub-module to modify the safety rank of the plurality of websites and update the data repository related to the plurality of websites with the new safety ranks for the respective websites. The updated data repository regarding the plurality of websites provides more relevant information based on community inputs, thus enabling admins to make better-informed decisions, as well as allow for dynamic updates of whitelist and blacklists for the family of routers that are part of the collective system.

Figure 7:
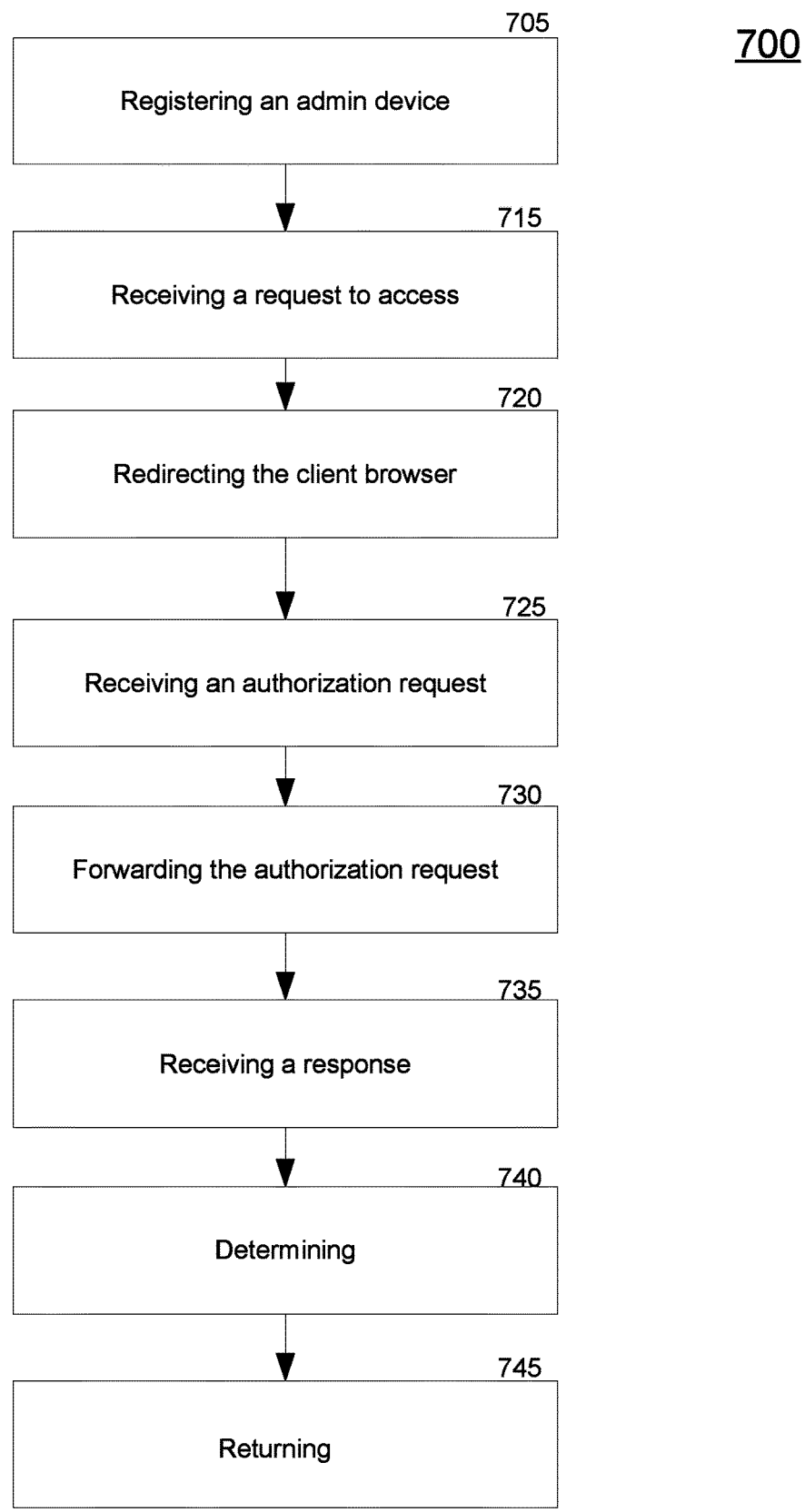
FIG. 7 illustrates, in flowchart form, an exemplary method for remotely controlling access to online content.

Now, with reference to FIG. 7, embodiments provide a method 700 that may allow for an admin to control a client's access to online content by approving or denying access requests from the client device. Such a method may comprise the step of registering an admin device 705. The registration of the admin device may be directly with the server or via the router. More than one admin devices or admin accounts may be registered in such a manner. A client device may then transmit a request to access a website or other content to the router. Upon receiving the request to access 715 online content from the client device, the router may allow access to the requested website or redirect the client browser 720 to a web interface page present on the server. Through the web interface page the client device may request authorization to access the content. The router may receive the authorization request 725 from the client device and may forward the authorization request 730 to the admin device. Embodiments may provide for the transmission of the authorization request to the admin device to be in a multitude of communication forms including but not limited to, simple message service (SMS), via in-app notification from an application running on the admin device, and via online portal. The admin may select one of allowing or denying the request for access from the client device. The admin device may transmit the admin response to the access request back to the router, and the response may be. Once the router receives the response 735 to the access request form the admin device the router determines whether to allow or deny access 740 to the client device based on the response from the admin device. This determining may be predicated wholly, or in part, on the admin response to the access request. The router may determine to provide access to the requested content responsive to receipt of an approval of access from the admin device. Similarly, the router may determine to deny access to the requested content responsive to the receipt of a denial of access from the admin device. The router may, responsive to said determination, return 745 a result to the client device. The result returned may comprise an access denied response if the determination made was that the client device should be denied access to the content. Similarly, the result returned may be the requested content in the event the determination made was that the client device should be permitted access to the content. The content retuned to the client device may be via the server.

Figure 8:
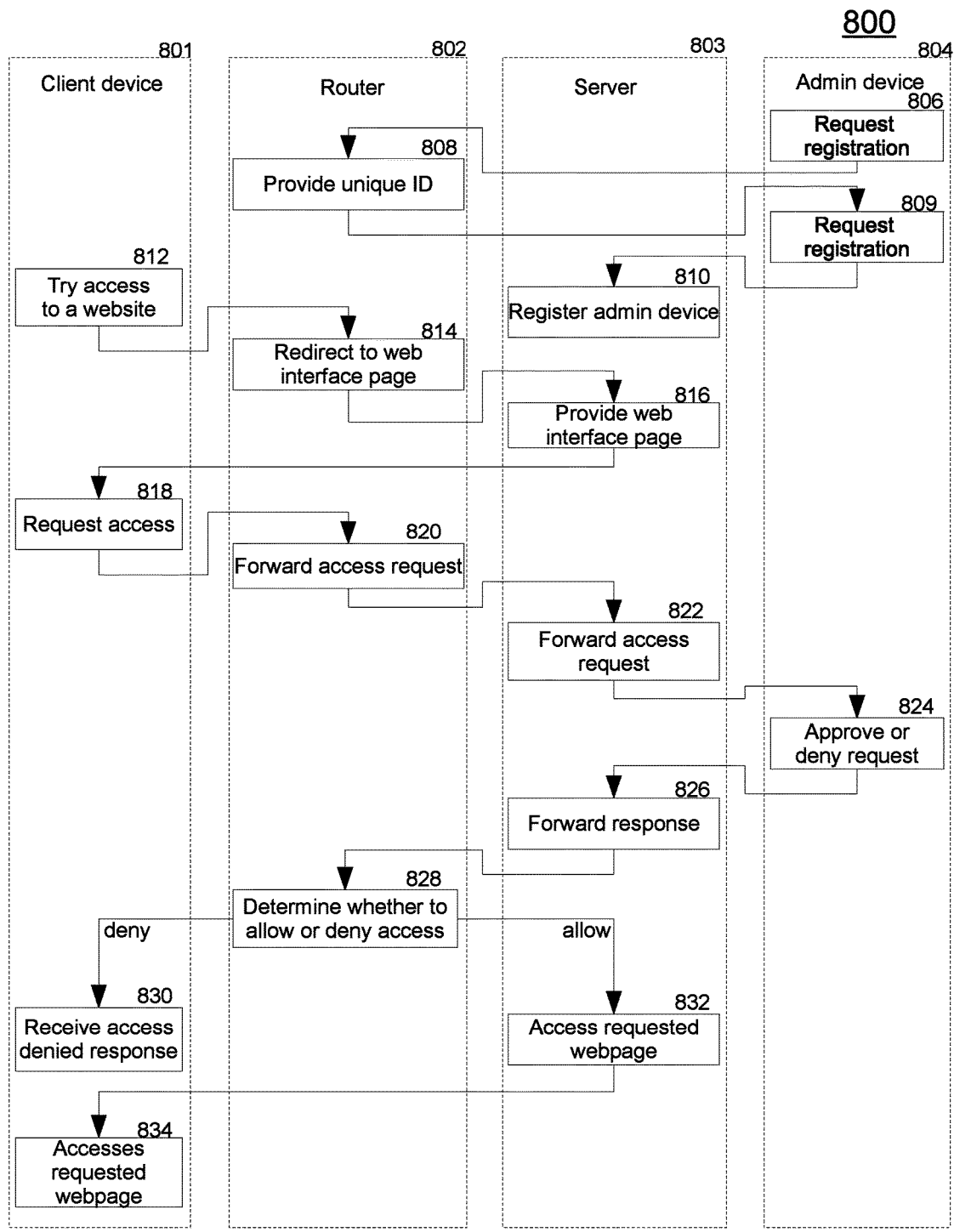
FIG. 8 illustrates, in flowchart form, an exemplary method for remotely controlling access to online content, and an exemplary system architecture therefore, according to some embodiments.

FIG. 8 presents a flowchart similar to that of the method 700; however the embodiment depicted in method 800 presents more details of the method steps, and shows a potential system architecture and process flow of these method steps across the system architecture. Embodiments of method 800 may be run using a system architecture comprising a client 801, a router 802, a server 803, and an admin device 804. In method 800 admin device 804 may generate a request for registration 806 which may be transmitted to the router 802. Responsive to the receipt of the registration request 806 from the admin device 804 the router 802 may provide a unique identifier 808 back to the admin device 806. This unique identifier may be associated with, and used to identify the admin device 804 during and after the registration process. Once the registration request 806 reaches the server 803 the admin device 804 may be registered 810. A client device 801 may generate a request to access a website 812 which may be sent to the router 802. Responsive to the receipt of the request to access a website 812 from client device 801 the router 802 may allow access to the requested webpage based on some access rules or forward the access request 820 to the server 803, which may then forward the access request 822 to the admin device 804. Once the access request 818 is received at the admin device 804 the admin may respond to the access request and either approve or deny the request 824. The response may be transmitted from the admin device 806 to the server 803, and forwarded from the server 803 to the router 802. Once received at the router 803 the admin's response to approve or deny the request 824 may be used to cause a determination at the router 802 of whether to allow or deny access 282 to the website requested by the client device 801. If the determination made at the router 802 is to deny access to the website, the router 802 transmits a response to the client device 801, and the client device 801 receives an access denied response 830. If the determination made at the router 802 is to allow access to the website, the router 802 accesses the requested webpage 832 via the server 803, and the client device 801 is allowed to access the requested webpage 834.

If FIG. 8 is viewed from the router side, embodiments of method 800 shows that the router 802 may provide a unique identifier 808 to an admin device 804 requesting registration. The router 802 may receive a request to access a website 812 from a client device 801. The router 802 may then redirect 814 the client device 801 to a web interface page accessed via the server 803. The router 802 may receive a request to be permitted access 818 to the website from the client device 801. The router 802 may forward this request to the registered admin device 804 via the server 803, and, also via the server, may receive back from the registered admin device 804 an approval or denial 824. The router 802 may use to the content of the response 824 from the registered admin device 804 to determine whether to allow or deny access 828 to the website. If the determination 828 is to deny access, then the router 802 may send an access denial message to the client device 801. If the determination 828 is to allow access, then the router 802 may request to the request access to the website from the server 803 and permit client device 801 to access said website via the server 803.

If FIG. 8 is viewed from the server side, embodiments of method 800 may comprise server 803 receiving a request 809 to register an admin device 804. Said request 809 may comprise a unique identifier provided to the admin device by the router. Responsive to this request 809 the server 803 may register 810 the admin device 804. The server 803 may provide access to a web interface page 816 responsive to receipt of a request to access a web page from the router 802. This web interface page may be provided 816 to the client device 801 by the server 803. The server 803 may receive a request for permission to access to the website 820 from the router 802, and may forward the access request 822 to the registered admin device 804. The server 803 may receive a response 824 from the registered admin device 804 either approving or denying the request. The server 803 may forward the response received form the registered admin device 824 to the router 802. In the event that the router 802 makes the determination to provide access to the requested webpage the router 802 may transmit, and the server 803 may receive, a command to access the requested webpage. Responsive to receipt of said command, the server 803 may access the requested webpage 832 and provide that access 834 to the client device 801. In the event that the router 802 makes the determination to deny access to the requested webpage the router 802 may transmit, and the server 803 may receive, a command not to access the requested webpage. Responsive to receipt of said command, the server 803 may deny access to the requested webpage.

In embodiments, the server 803 may provide configuration data in addition to the response from the registered admin device 804 to the router 802. The configuration data may comprise instructions for programming/configuring the router to allow or deny access to the requested website.

In embodiments, the server may perform the step of configuring the router to allow or deny access to the requested website responsive to the receipt of the response from the registered admin device.

In embodiments, one or more of the router and the server may perform a threat/safety analysis on the requested webpage. The results of this threat/safety analysis may be sent to the admin device along with the access request.

In embodiments, access to the requested website may be sent along with the authorization request to the admin device such that the admin device may view or preview the website prior to responding with an approval or denial of the access request.

In embodiments, the admin device may be a mobile device, such as a smart phone, laptop, or tablet. The request to access the website may be sent to the admin device via a suitable communications medium, such as but not limited to simple text service, in application notification, online access through a web-portal, etc.

A method and system to enable controlled safe browsing of the Internet is described. Although specific embodiments are illustrated and described herein, it will be appreciated by those of ordinary skill in the art that any arrangement, which is calculated to achieve the same purpose, may be substituted for the specific embodiments shown. This application is intended to cover any adaptations or variations. For example, although described as applicable to minors with emphasis on usage at home or in school communities, one of ordinary skill in the art will appreciate that the invention is applicable to other environments, such as, businesses and governments, where there may exist a need to provide controlled online access and/or a need to limit the access to certain sites.

In particular, one of skill in the art will readily appreciate that the names of the methods and apparatus are not intended to limit embodiments. Furthermore, additional methods and apparatus can be added to the components, functions can be rearranged among the components, and new components to correspond to future enhancements and physical devices used in embodiments can be introduced without departing from the scope of embodiments.

It is noted that several of the embodiments of the methods disclosed and discussed herein may be capable of performance at one or more of the router and server levels. Therefore, it will be understood to one having skill in the art to understand and practice the teachings herein at either level without departing from the scope of this disclosure.

What is claimed is:

1. A method for remotely controlling access to a web site, comprising the steps of:
   registering an admin mobile device with a server connected to a router;
   receiving a request to access the web site from a client browser connected to the router;
   retrieving, to the router, a crowd sourced safety rank for the website;
   accessing, in the router, a client profile stored on one of the router and the server;

analysing in the router, the crowd sourced safety rank for the website and the client profile to determine that access to the website is not permitted;

redirecting the client browser to a web interface page on the server;

receiving, in the router, an authorization request from the client browser via the web interface page;

forwarding the authorization request from the router via a communication message to the registered admin mobile device;

receiving, in the router, a response from the registered admin mobile device;

determining, in the router, one of allowing and denying said request to access the website responsive to the receipt of the response;

returning, from the router responsive to said determining, one of the website and an access denied message to the client browser.

2. The method of claim 1, wherein the step of receiving a response comprises receiving the response from an application running on the admin mobile device.

3. The method of claim 1, wherein the step of receiving a response comprises receiving the response from the admin mobile device via the server.

4. The method of claim 1, wherein the step of forwarding the authorization request is performed via an internet connection.

5. The method of claim 1, wherein the step of forwarding the authorization request is performed via simple message service.

6. The method of claim 1, wherein the response comprises configuration data.

7. The method of claim 1, further comprising the step of routing the response to the router through the server.

8. A method for remotely controlling access to a website, comprising the steps of:

registering an admin mobile device with a server connected to a router;

sending to the router a crowd sourced safety rank for a web site responsive to a query from a browser;

determining, in the router based on the crowd sourced safety rank that access to the web site is not permitted;

receiving a request from the router to access a web interface page on the server;

serving the web interface page to the router;

receiving, in the router, an authorization request via the web interface page;

sending the authorization request from the router via a communication message to the registered admin mobile device;

receiving, in the router, a response from the registered admin mobile device;

determining, in the router, one of allowing and denying said request to the website responsive to the receipt of the response;

configuring the router in performing said determination to return one of the website and an access denied message to the client browser.

9. The method of claim 8, wherein the step of receiving a response comprises receiving the response from an application running on the admin mobile device.

10. The method of claim 8, wherein the step of receiving a response comprises receiving the response from the admin mobile device via the router.

11. The method of claim 8, wherein the step of sending the authorization request is performed via an internet connection.

12. The method of claim 8, wherein the step of sending the authorization request is performed via simple message service.

13. The method of claim 8, wherein the response comprises configuration data.

14. The method of claim 1, wherein the client profile is stored on the router.

15. The method of claim 1, wherein the client profile is stored on the server.

* * * * *